June 25, 1935.  D. W. RUDORFF  2,006,059
HEATER
Filed May 23, 1933
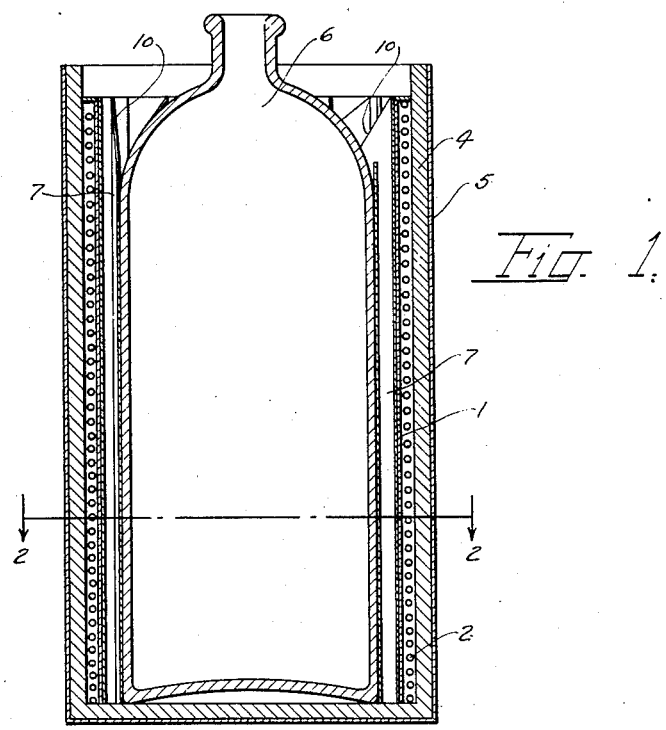
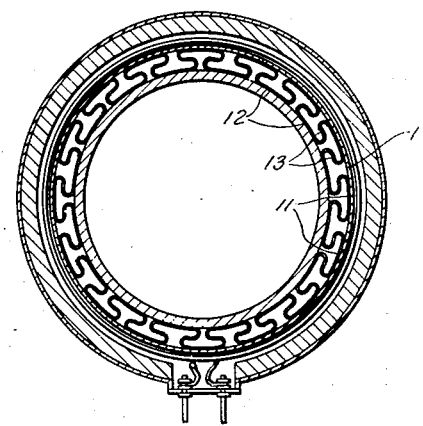
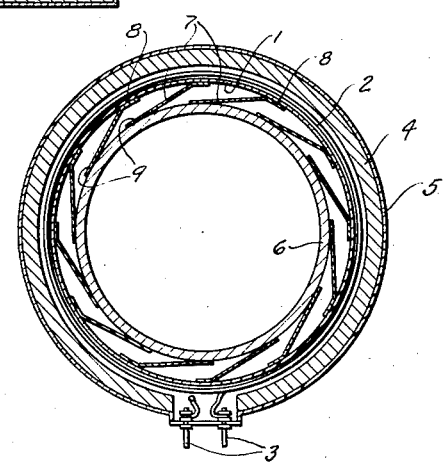
INVENTOR
DAGOBERT W. RUDORFF
BY O. V. Thiev
ATTORNEY Patented June 25, 1935

2,006,059

UNITED STATES PATENT OFFICE 2,006,059

HEATER

Dagobert W. Rudorff, Berlin-Wannsee, Germany

Application May 23, 1933, Serial No. 672,383

9 Claims. (Cl. 219—43)

The invention relates to appliances for heating materials electrically and is illustrated in connection with a bottle containing a fluid such as milk. As will however be understood from the ensuing description, the material to be heated may be of other descriptions. It may for example be lead which is to be melted in a container. The object of the invention is to provide a heating device of this kind which will be simple in construction and which will transmit the heat from the electrical element quickly to the material to be heated.

The invention is illustrated in the drawing filed herewith in which Fig. 1 is a longitudinal central section of an appliance in accordance with my invention, showing its specific application to the heating of a milk bottle. Fig. 2 is a section on line 2—2 of Fig. 1, and Fig. 3 is a sectional view similar to that of Fig. 2 showing a modification.

The cylindrical sheet 1 has wound around its exterior but electrically insulated from it the electric wire 2, current to which is supplied through the terminals 3. Radiation outward is prevented by a heat insulating layer 4 of any suitable material, the whole being contained in the exterior vessel 5.

The rapid transmission of heat to the bottle 6 which my invention is intended to provide is effected by means of resilient heat transmission elements contacting with both the sheet 1 and the bottle 6. In the form of Fig. 1 these elements are in the shape of vertical strips 7—7 which are secured to the sheet 1 along the lines 8—8 by any desired means such as welding or riveting. They are given such shape that when the bottle 6 is inserted into position, they bear resiliently against it at points 9—9. Preferably I make the strips of phosphor-bronze as this material has the desirable qualities of resiliency and good heat conduction, but other substances may be used if desired.

To facilitate the insertion of the bottle 6 the strips 7—7 are preferably bevelled off at the top as indicated at 10—10.

The purpose of this construction will be obvious from what has been stated. The heat from the heating element 2 is transferred from sheet 1 to the bottle 6 by means of the strips 7, resulting in a very efficient action.

It will be clear that the form of the resilient elements can be varied in a great many ways. In Fig. 3 there is shown one variation. This consists in making the heat transmitting element a continuous sheet of metal with curved portions 11—11 in contact with the sheet 1 and curved portions 12—12 adapted to contact with the bottle, the two being connected by reversely curved resilient portions 13—13. The portions 11—11 may also be secured in this case to the sheet 1, although from the shape of the heat transferring insert, this is not really required, its form causing it to spring outwardly into contact with the sheet 1. In fact, it is preferable to leave it separate so that it can readily be removed for purposes of cleaning it and the container. This also makes it possible to have different sizes of inserts so bottles of different sizes can be heated.

It will be obvious that the object to be heated need not be a milk bottle but may be a vessel for some other purpose, such for example as a vessel containing lead which is to be melted or kept melted. There are other uses to which the invention may be applied which will readily suggest themselves.

What I claim is:

1. In apparatus of the class described and intended for heating an article, the combination of a metallic container into which the article may be placed, means to heat the walls of the container externally, and resilient heat transmitting elements adapted, when the article is placed in the container, to engage the inner wall of the container and the article to be heated.

2. In apparatus of the class described, and intended for heating a vessel containing a liquid, the combination of a metallic container into which the vessel may be placed, means to heat the walls of the container externally, and heat transmitting elements extending from top to bottom between the container and vessel when the latter is placed in the former and resiliently engaging both.

3. A device for heating a vessel comprising a container into which the vessel is placed, means to heat the container electrically externally, and resilient heat transmitting means extending from the inner wall of the container and adapted to engage the vessel.

4. A device for heating a vessel electrically comprising a container, an electric heating coil wound on the container to heat it externally, and elongated vertically extending resilient heat transmitting elements extending inwardly from the container wall and adapted to engage the vessel.

5. A device for heating a vessel electrically comprising a cylindrical container, an electric heating coil wound on the container to heat it externally, resilient heat transmitting strips secured to the inner wall of the container parallel to its axis and adapted to engage the vessel.

6. A device for heating a cylindrical vessel electrically comprising a cylindrical metallic container, an electric heating coil wound on the container to heat it externally, heat transmitting means comprising a plurality of flat portions engaging the inner wall of the container along lines parallel to its axis, a plurality of flat portions adapted to engage the vessel, and resilient means connecting the two sets of flat portions to press them resiliently into contact with the inner wall of the container and the outer wall of the vessel.

7. A device for heating a cylindrical vessel electrically comprising a cylindrical container, an electric heating coil wound on the container to heat it externally and resilient means inserted in the container but not secured to it adapted to make close contact with the container at points distributed over the interior of the container and with the cylindrical vessel when the latter is inserted into the container.

8. In apparatus of the class described and intended for heating an article, the combination of a metallic wall, means to heat the wall electrically on one side, and resilient elements adapted to transmit heat and engaging the opposite side of the wall and resiliently engaging the article.

9. In apparatus of the class described and intended to heat an article, the combination of metallic means adapted to surround the article on its sides, and resilient elements adapted to transmit heat and engaging the inner side of the metallic means and resiliently engaging the article.

DAGOBERT W. RUDORFF.